UNITED STATES PATENT OFFICE.

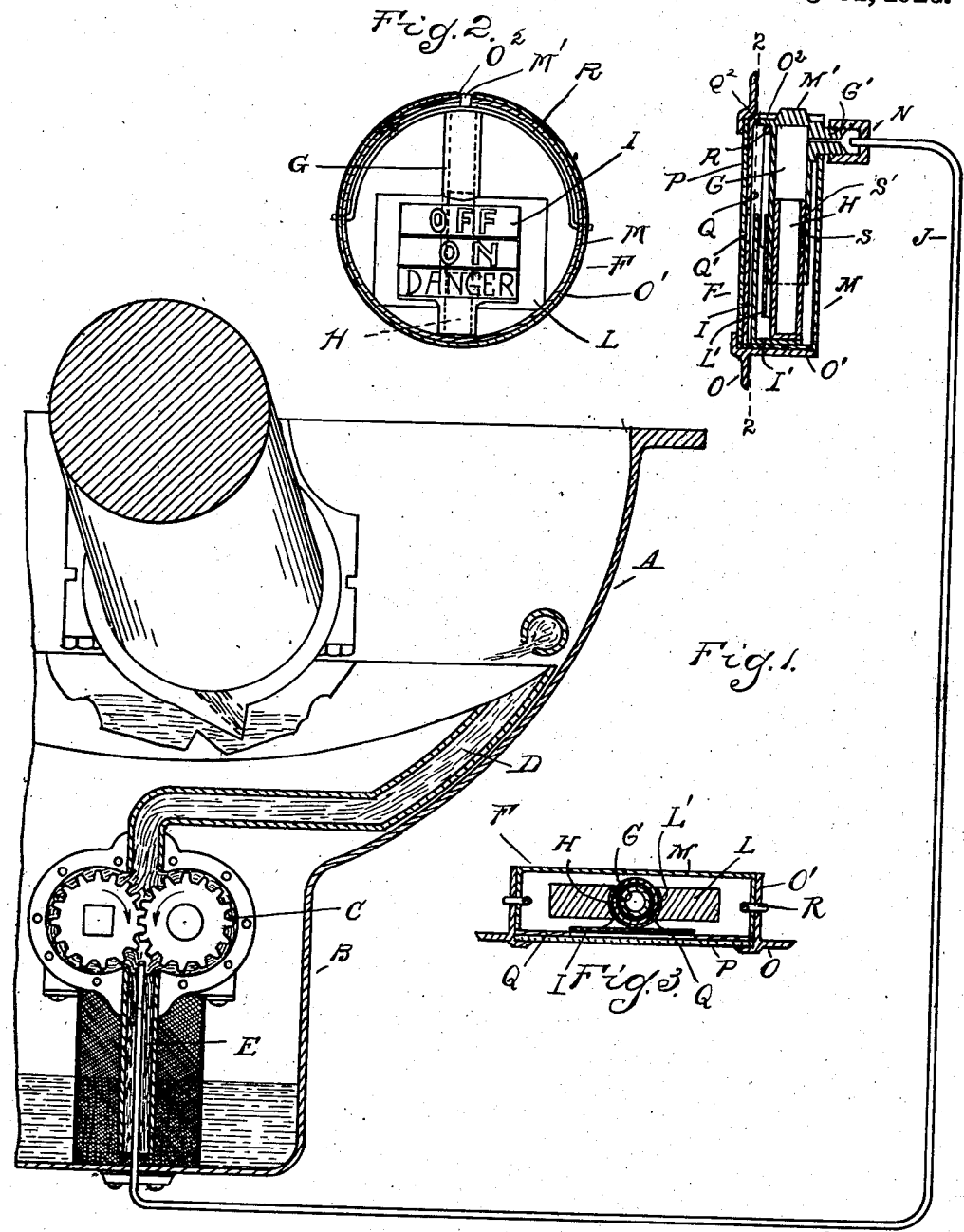

JAMES ERSKINE, OF FLINT, MICHIGAN.

GAGE.

1,351,419.   Specification of Letters Patent.   Patented Aug. 31, 1920.

Application filed March 23, 1918. Serial No. 224,135.

*To all whom it may concern:*

Be it known that I, JAMES ERSKINE, a citizen of the United States of America, residing at Flint, in the county of Genesee and State of Michigan, have invented certain new and useful Improvements in Gages, of which the following is a specification, reference being had therein to the accompanying drawings.

The invention relates to gages particularly designed for use in indicating the flow of lubricant in such a lubricating system as is hereinafter described and is further described and claimed in my co-pending application, Serial No. 188,370, and the invention comprises the novel construction as hereinafter set forth.

In the drawings:

Figure 1 is a diagrammatic view showing my gage in connection with the propelling pump of an engine-lubricating system;

Fig. 2 is a sectional elevation of the gage;

Fig. 3 is a horizontal section therethrough.

In the present state of the art various gages have been devised which operate by the positive pressure developed by the lubricant pump, this pressure being usually communicated to the indicator by air. One objection to such constructions is that where there is any clogging or stoppage of the lubricant while the pump is still in operation the pressure may rise to a point where it will force lubricant into the gage or indicator. I have avoided this difficulty by operating my improved gage or indicator from the suction side of the pump, so that there can never be any discharge of lubricant at the indicator.

As shown, A is the crank case of an engine, B the oil-well therein, C a lubricating pump, shown as of the intermeshing-gear type, D the discharge conduit from said pump and E the suction conduit thereof. F is my improved gage or indicator, which comprises a cylinder G with a slidable piston H therein and an indicator I attached to the piston. The cylinder G is connected by a conduit J with the pump, said conduit extending into the suction conduit E, as shown. Thus when the pump is in operation air will be drawn out from the conduit J into the liquid in the pump, causing the piston H to rise by atmospheric pressure and display the indicator I. Sufficient clearance is provided between the piston and cylinder to permit a slight leakage of air, so that whenever the flow of lubricant through the suction conduit is arrested the air pressure within the cylinder will equalize that without, and the piston and indicator will drop.

It is obvious that with this construction there can be no danger of discharging the lubricant into the indicator, as the flow is in the reverse direction. On the other hand, a positive indication of the flow of lubricant through the pump is given and by properly proportioning the bleed or leakage of air a falling in the flow beyond a predetermined point will be observed on the indicator. Under certain conditions, such for instance as the freezing of water which is mixed with the oil, there may be a stoppage in the lubricant circulating system, which if the pump continues to operate is dangerous. I therefore have provided means for indicating such a condition, which as shown consists of a weighted stop L, which arrests movement of the piston and indicator under normal conditions and which will be lifted to display a danger signal under abnormal conditions. It is obvious that if there is a stoppage which prevents flow of oil through the suction conduit E, a high vacuum will be formed which, reacting upon the conduit J and cylinder G, will lift the piston and weight L.

To produce an inexpensive construction to manufacture and one easily assembled, my gage is preferably specifically constructed as follows: The cylinder G is formed with a laterally-extending nipple G' which passes through the back of a housing M and is adapted to engage a coupling N for the securing of the conduit J. The indicator I has an angle shank I' attaching to the lower end of the piston, and the weighted stop L is slidably mounted upon the cylinder and lies adjacent to the indicator. Preferably said weight is formed in two parts disposed respectively at each side of the cylinder and connected to move as a unit by a yoke L' passing in front of the cylinder. O is a ring adapted for mounting upon the vehicle dash or other point of support. P is a glass face held by the ring and Q is an opaque disk adjacent to the glass having a slot Q' therein through which the signal is displayed. The ring O has a cylindrical flange O' for receiving the cup-shaped member M and the parts after engagement are locked by a spring R within the housing, having its opposite ends engaging registering apertures in the member M and flange O'. All of the circular parts may be held in proper registration by providing a slot O² in the flange O' with which is engaged projecting lugs Q² and M' on the members Q and M respectively.

In operation, when the pump is idle, as long as oil is not flowing through the suction conduit the piston H will drop to the bottom of the cylinder G, thereby lowering the indicator I to display the word "Off" or other indication that no oil is feeding. This position will also be assumed whenever there is a failure of oil supply which will unseal the end of the conduit J in the suction conduit E. Where there is oil and the pump is in operation, the suction produced in the conduit J will lift the piston, carrying the indicator with it, until the shank I' comes in contact with the weighted stop L. Under normal conditions the suction is insufficient to lift this weight and therefore the indicator will be in a position to display the word "On," or other indication that the oil is circulating. If, however, there is an abnormal condition, as previously described, the suction will lift the weight which will move the indicator to a position displaying the word "Danger."

It may be desirable in some applications of the invention to slightly relieve the suction in the cylinder G when the indicator is in "On" position, in order to decrease the lifting effect of the indicator upon the weight L, and for this purpose minute openings S and S' may be so located respectively in the piston H and cylinder G that they will register and permit a small inflow of air when the piston is in the position to display the word "On" through the slot Q'.

What I claim as my invention is:

1. A gage, comprising a slotted casing, a cylinder within said casing, a suction conduit connected with said cylinder, a piston within said cylinder, an indicator carried by said piston and operated thereby to selectively display a plurality of signals through said slot, and means for returning the indicator to normal position.

2. A gage, comprising a casing, a cylinder arranged normally within said casing and open at its lower end, a piston in said cylinder, an indicator connected to the lower end of said piston, a suction conduit connected with said cylinder for lifting said piston and indicator, and a weighted stop for normally arresting upward movement of said piston and indicator, yieldable upon abnormal suction to permit further movement of the indicator.

3. A gage, comprising a casing, a cylinder therein open at its lower end and having a rearwardly-extending nipple at its upper end extending out from said casing, suction means in communication with said nipple, a piston in said cylinder, an indicator connected to the lower end of said piston, and a weight sleeved upon said cylinder forming a stop for limiting the normal upward movement of said piston and indicator and adapted to be lifted by abnormal suction.

4. A gage, comprising a casing having a slotted wall, a cylinder within said casing in rear of said wall, extending vertically and open at its lower end, a piston in said cylinder, an indicator connected to the lower end of said piston and arranged between said cylinder and slotted wall, and a weight sleeved upon said cylinder having a yoke portion in the path of the connection between said indicator and piston to arrest upward movement thereof, whereby the abnormal suction in said cylinder will lift the weight.

5. A gage comprising a casing having a slotted wall, a cylinder within said casing, a piston in said cylinder, an indicator adjacent to said slotted wall connected with said piston and carrying a plurality of signals, one of which is normally displayed through the slot, and a stop member arresting movement of said indicator in a position displaying another signal through said slot, said stop member being yieldable under abnormal pressure to allow a further movement of the indicator and the display of a third signal through said slot.

6. A gage comprising a cylinder open to the atmosphere at one end and provided with a suction port at the other end, a piston in said cylinder loosely fitting to afford a restricted air passage between itself and the cylinder wall, means yieldably resisting the movement of said piston toward said suction port, an indicator member connected to said piston and extending exteriorly of the cylinder.

7. A gage, comprising a casing, a cylinder arranged within said casing and open at its lower end, a piston in said cylinder, an indicator connected to the lower end of said piston, a suction conduit connected with said cylinder for lifting said piston and indicator and a stop for normally arresting upward movement of said piston and indicator, yieldable upon abnormal suction to permit further upward movement of the indicator.

8. A gage, comprising a casing, a cylinder therein, open at its lower end and having a rearwardly extending nipple at its upper end projecting from said casing, a suction means in communication with said nipple, a piston in said cylinder, an indicator connected to the lower end of said piston, and a stop member sleeved upon said cylinder for limiting the normal upward movement of said piston and indicator, said stop being yieldable when the piston is subjected to an abnormal suction.

9. A gage, comprising a casing having a slotted wall, a cylinder within said casing extending vertically and open at its lower end, a piston in said cylinder, an indicator connected to the lower end of said piston disposed between said cylinder and slotted wall, and a stop member sleeved upon said cylinder having a yoke portion in the path of the connection between said indicator and piston to arrest upward movement thereof, said stop member being yieldable upon application of abnormal suction to the piston.

10. A gage, comprising a slotted casing, a cylinder within said casing, a suction conduit connected with said cylinder, a piston within said cylinder, an indicator rigidly connected to said piston and slidable therewith to selectively display a plurality of signals through said slot and means for returning the indicator to normal position.

11. A gage, comprising a casing, a substantially vertical piston and cylinder within said casing, an indicator operable by relative movement of said piston and cylinder, a suction conduit associated with said piston and cylinder and communicating with the latter to lift one of said parts, an indicator connected to said part, and a weighted stop for normally arresting upward movement of said part yieldable upon abnormal suction to permit a further movement.

In testimony whereof I affix my signature.

JAMES ERSKINE.